United States Patent [19]
Cox

[11] 3,831,432
[45] Aug. 27, 1974

[54] ENVIRONMENT MONITORING DEVICE AND SYSTEM

[75] Inventor: Paul F. Cox, Richardson, Tex.

[73] Assignee: Texas Instruments Incorporated, Dallas, Tex.

[22] Filed: Sept. 5, 1972

[21] Appl. No.: 286,522

[52] U.S. Cl............... 73/23, 23/254 E, 29/571, 29/574, 73/27 R, 317/235 B, 317/235 AG
[51] Int. Cl............... G01n 31/06, H01l 9/00
[58] Field of Search... 73/23, 27 R; 317/235, 235 B, 317/235 AG; 29/571, 574; 23/232 E, 254 E

[56] References Cited
UNITED STATES PATENTS

| | | | |
|---|---|---|---|
| 2,975,362 | 3/1961 | Jacobson | 73/23 X |
| 2,998,554 | 8/1961 | Koets et al. | 317/234 |
| 3,329,004 | 7/1967 | King | 73/23 |
| 3,469,147 | 9/1969 | Benzing | 317/235 AG |
| 3,507,145 | 4/1970 | Loh | 73/23 |
| 3,586,554 | 6/1971 | Couture et al. | 317/235 B |
| 3,685,140 | 8/1972 | Engler | 29/571 |

OTHER PUBLICATIONS
IBM Journal, Chemical and Ambient Effects, H. S. Lehman, pp. 422–426, Sept. 1964.

Primary Examiner—Richard C. Queisser
Assistant Examiner—Stephen A. Kreitman
Attorney, Agent, or Firm—Harold Levine; Edward J. Connors, Jr.; William E. Hiller

[57] ABSTRACT

A monitoring system for characterizing the presence and concentration of selected substances in an environment is provided. The system includes a set of sensors which provide outputs responsive to substances adsorbed from the environment, at least one of the sensors having an output which differs from others in the set in its response to at least one substance being monitored. Preferably the sensors comprise adsorption field effect transistors respectively having chemically specific films in the gate region to enable preferential adsorption of preselected substances.

17 Claims, 6 Drawing Figures

ENVIRONMENT MONITORING DEVICE AND SYSTEM

The present invention pertains in general to environment monitoring systems and more particularly to such a system which utilizes adsorption field effect transistors having chemically specific films in the gate region to enable preferential adsorption of selected substances.

Continued pollution of the environment has initiated increased ecological concern with a corresponding requirement for a system effective to continuously monitor the environment and detect the concentration of selected pollutants. One proposal for such a monitoring system utilizes a network of sensor stations which monitor the composition and physical properties of the atmosphere. Data from each station is digitized and transmitted directly to a large time-shared computer system, where it is combined with current meterological information for evaluation. The computer system contains the hardware and software necessary to obtain information on air quality for a region and to pinpoint problem spots within that region. The total system must have the ability to anticipate problems in time to initiate corrective action and to sound the alarm when dangerous pollution levels have been reached. Correlation of the enormous amounts of information which will be obtained by the system will permit the evaluation of pollution abatement measures and the prediction of long-term effects on our ecology.

One of the major considerations in the development of a cost effective system for the characterization of ambient air or emissions depends on the availability of suitable low cost sensors. These sensors must have the sensitivity, selectivity, and stability necessary to measure accurately and reliably the concentration of a variety of atmospheric pollutants. One proposed type of sensor is a semiconductor device. The electrical properties of semiconductor devices are sensitive to small concentrations of surface contamination and thus can be used to detect the presence of various substances. Reference, e.g., T.M. Buck et al, "Detection of Chemical Species by Surface Effects on Metals and Semiconductors," Conference on Surface Effects in Detection (Spartan Books, Inc., 1965, p. 147). A major problem to date with such semiconductor detectors is their limited selectivity.

Ideally, each of the sensors of an environment monitoring system should respond to a specific pollutant and be passive to other atmospheric constituents. However, this degree of selectivity is not essential, and the desired discrimination can be obtained if the sensors possess the following characteristics: (1) Each sensor in the array responds primarily to one pollutant or class of pollutants, such as organic amines, alcohols, etc.; (2) The secondary response of each sensor to other atmospheric constituents is known; and (3) The number of sensors equals or exceeds the sum of the pollutants to be monitored and other atmospheric constituents which produces secondary sensor response.

Accordingly, an object of the invention is the provision of a system for characterizing an environment as to the presence therein of preselected substances.

A further object of the invention is a system for monitoring the atmosphere for detection of pollutants.

An additional object of the invention is a semiconductor sensor for use in an atmosphere monitoring system.

Yet another object of the invention is a set of semiconductor sensors for use in a monitoring system wherein chemically specific films are associated with respective sensors to enable determination of the concentration of a plurality of substances.

Still another object of the invention is the provision of a pollution monitoring system having sensors comprised of adsorption field effect transistors, the gate regions of which are defined by chemically specific films.

Briefly in accordance with the invention a system is provided for measuring the concentration of a variety of substances in a test environment, such as the ambient atmosphere, a blood sample, a breath sample, etc. The system includes a number of substantially identical semiconductor sensors respectively including means for effecting preferential adsorption of specific ones of selected substances to provide outputs correlatable to the respective concentration of each of the substances being monitored. In operation of the system a set of sensors is provided, each of which differs from other members of the set in its response to at least one substance being monitored. Each member of the set is characterized to the degree necessary for unambiguous computer reduction of the response matrix.

More particularly, the sensors are characterized by a semiconductor substrate of one conductivity type having at least two spaced apart regions of opposite conductivity type extending from one surface of the substrate. The semiconductor material between the spaced apart regions defines a channel having an initial conductance for a given bias between the spaced regions. A chemically specific film overlies the channel and enables preferential adsorption from the environment of preselected substances whereby the adsorbed material modifies the initial channel conductance by an amount corresponding to the concentration of the substance in the environment.

At this juncture it might be noted that even though most pollutants whose surface contamination effects are to be measured are not, in general, electrically charged species, most of them are polar. Hence, the accumulation, i.e., adsorption, of these materials on a semiconductor surface sets up a localized field which causes the bulk semiconductor material to accumulate charges near the surface to offset this field. The effect of surface contaminants is sufficiently strong to completely dominate the bulk electrical properties near the surface, and any electronic devices whose function is strongly influenced by surface effects is particularly sensitive to the adsorbed material. In accordance with the present invention, a field effect transistor strucutre is used as a sensor to detect the presence of adsorbed layers of different pollutants. The nature of the adsorbed layer is controlled by a chemically specific film formed in the gate region of the transistor structure.

Other objects, advantages, and features of the present invention will be apparent upon reading the following detailed describption of illustrative embodiments in conjunction with the drawings wherein.

Figure 3:
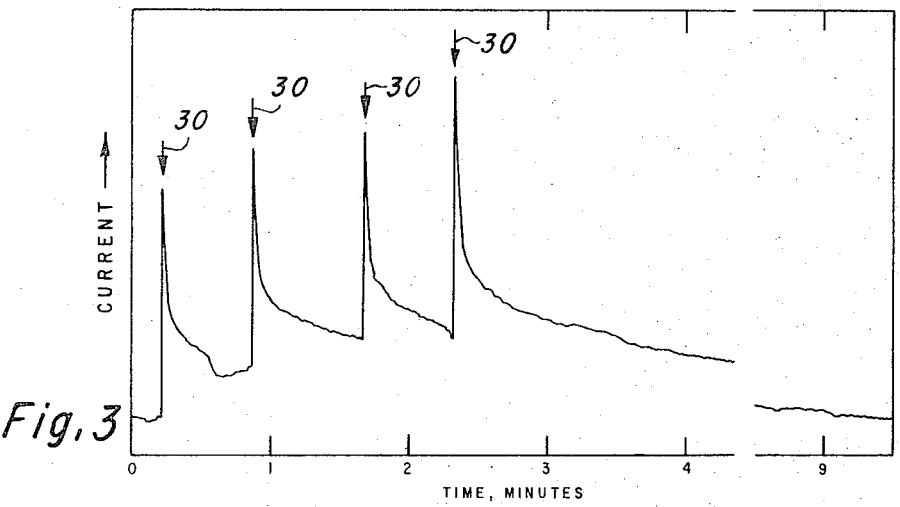
Figure 4:
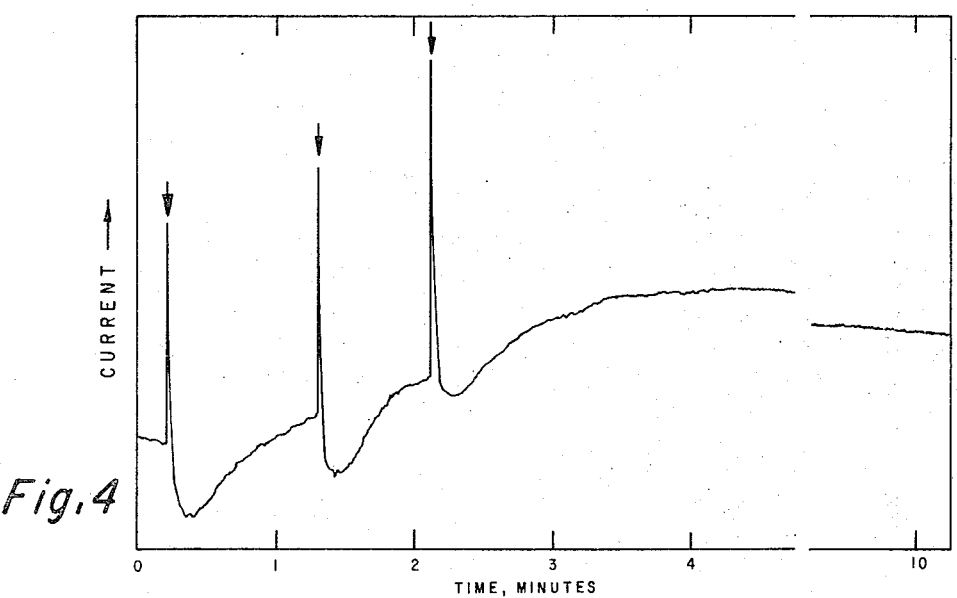
Figure 5:
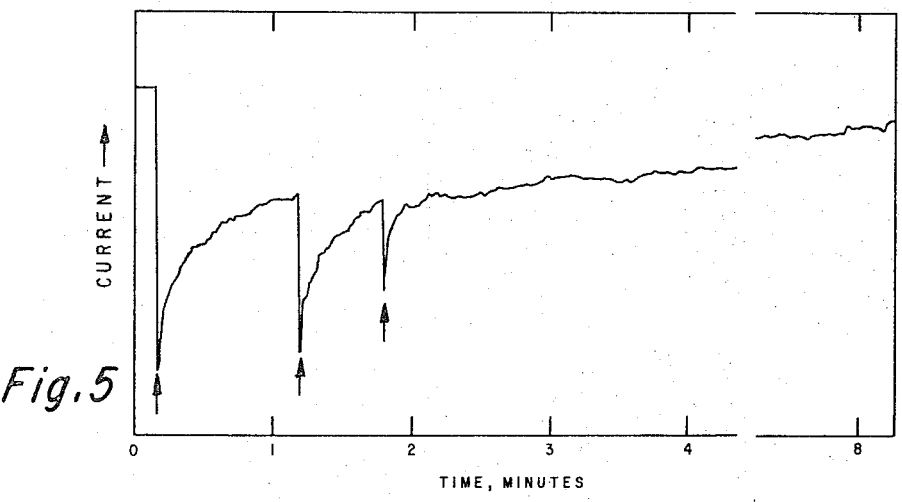

FIG. 3 graphically depicts the response of a solid state sensor in accordance with the invention to water vapor injection;

FIG. 4 graphically depicts the response of a solid state sensor in accordance with the invention to ammonia; and FIG. 5 graphically depicts the response of a solid state sensor in accordance with the invention to hydrogen chloride injection.

As pointed out previously, the electrical characteristics of certain semiconductor devices varies with the presence of certain substances on the surface of the device. Typically, semiconductor devices are passivated in order to prevent such effects. In accordance with the present invention, however, this sensitivity to surface contaminants is controlled in order to provide a suitable sensor for an environment monitoring system.

Figure 1:
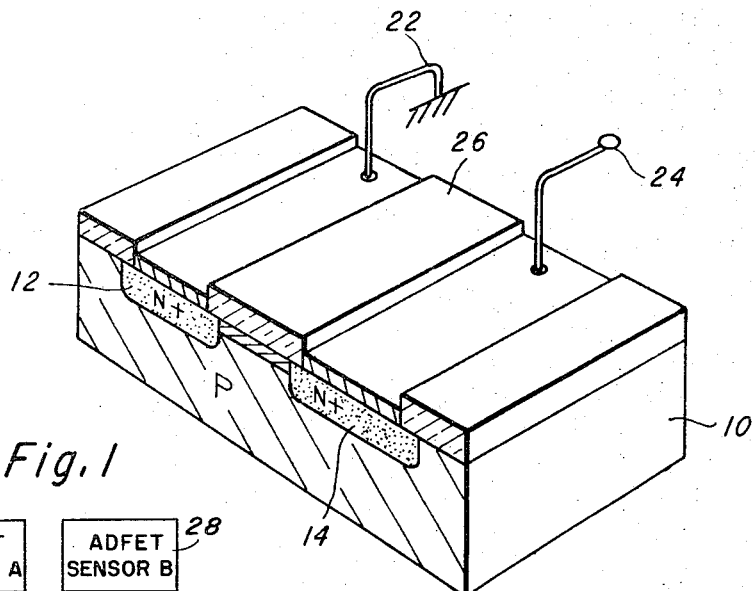
FIG. 1 is a pictorial illustration of an adsorption field effect transistor in accordance with the invention.
Figure 2:
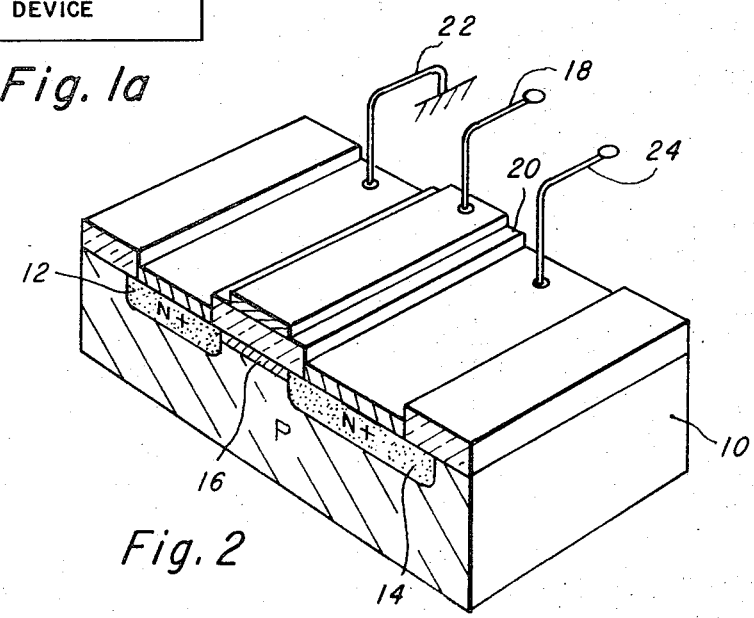
FIG. 2 is a pictorial illustration of a conventional insulated gate field effect transistor.

With respect to semiconductor devices which are affected by surface contaminants, the insulated gate field effect transistor (IGFET) is representative of a device which is extremely sensitive to image charge, and a structure somewhat similar to a conventional IGFET finds applicability as a sensor for the characterization of pollutants in the atmosphere in accordance with the invention. The IGFET is advantageous because its operation is dependent solely on surface field effects. A typical IGFET is illustrated in FIG. 2. A modification of this basic structure is illustrated in FIG. 1 and defines the basic sensor in accordance with the present invention. This modified structure is characterized as an adsorption field effect transistor (ADFET), and its structure and operation will be described in detail below.

Understanding of the ADFET sensor of the present invention will be facilitated by first considering a conventional IGFET such as illustrated in FIG. 2. The IGFET includes two relatively heavily doped regions 12 and 14 of one conductivity type, respectively defining the source and drain regions. These regions are defined in a lightly doped substrate 10 of opposite conductivity type. The semiconductor material between regions 12 and 14 defines a channel 16 which is separated from the gate electrode 18 by a thin insulating film 20. Conductive electrodes 22 and 24 define source and drain electrical contacts. Operation of an IGFET is well understood in the art and need not be explained in detail herein. In general, however, it will be observed that in the absence of channel inversion, the electron population is low (for an n-channel enhancement mode transistor) and the source-channel-drain form back-to-back junction diodes. Channel conductance is limited to reverse bias leakage. The conductivity of the channel is controlled by an external gate bias.

With reference now to FIG. 1, an ADFET sensor in accordance with the invention is illustrated. It will be noted that the ADFET structure resembles the IGFET of FIG. 2 except that the ADFET has no gate electrode. Rather, a chemically specific film 26 is formed in the gate region. As will be explained in more detail below, the film 26 enables preferential adsorption of selected substances. As noted previously, while most of the substances of interest are not electrically charged, they are polar, and their adsorption in the gate region of a field effect transistor structure sets up a localized field which causes the bulk semiconductor material to accumulate charges near the channel surface to offset this field. The effect of surface contaminants is strong enough to modify the channel conductance.

An n-type enhancement mode ADFET is illustrated in FIG. 1 wherein a positive surface potential is required to initiate channel conductance. It is understood, of course, that depletion type n-channel structures could be prepared by doping the channel with n-type impurities. Depletion type structures have built-in inversion layers and appreciable channel conductivity in the absence of external bias or adsorbed ions. The use of such structures as a sensor would have the advantage of requiring no initial charge to produce inversion. The adsorption of positive ions or Lewis bases increases channel conductivity, while negative ions or Lewis acids decreases conductivity. Structures defining p-channel devices, of course, may be used and would possess complementary electrical properties and responses to surface adsorption.

In operation of the sensor in accordance with the invention, the adsorption of minute quantities of atmospheric pollutants on a clean semiconductor surface can produce large, easily measurable changes in the electrical properties of the device. The magnitude of these changes is determined by the concentration of each atmospheric constituent on the surface and the strength of the dipolar interaction with the semiconductor. The surface concentration of each pollutant is related to its concentration in the gas phase by an adsorption isotherm. In a practical sense, the adsorption isotherm of the surface must be different for various pollutants and will be determined by the chemical nature of both the surface and the pollutant. The practical utilization of the adsorption isotherm depends on obtaining some selectivity. Reversibility of the adsorption process would be desirable and might be obtained by heating or by displacement effects. However, an irreversible surface reaction can be used to integrate the concentration of a pollutant as a function of time. The time derivative of the response can be used to obtain the instantaneous value of the concentration. The rate at which total saturation is approached then determines the total integration period and the accuracy obtainable for a continuous measurement.

The important consideration is not that total selectivity or total reversibility be obtained, but that the individual sensors be reproducible and their response well characterized. If these criteria are met, the desired discrimination of pollutants in time can be obtained by computer analysis of the response data.

One method for obtaining selectivity is to measure the response of the sensors as a function of time after exposure to atmospheric contamination. In accordance with the invention an n-channel device structure was used similar to the ADFET structure described previously with reference to FIG. 1. The entire sample was etched prior to final metal deposition, and the surface of the active channel was covered with a native oxide film which as formed on exposure to the atmosphere. This oxide was on the order of 50 A in thickness.

The device was exposed to the atmosphere prior to testing to allow the surface to come to equilibrium with its environment. FIG. 3 shows the effect on conductivity produced by injection of air saturated with water vapor. Each injection, shown by arrows 30, produced an immediate increase in conductivity. The adsorbed water acts as a Lewis base and increases the number of electrons in the channel. The water is then slowly desorbed, and the conductivity returns to its original value in less than ten minutes.

Injection of ammonia also resulted in an immediate increase in conductivity, as shown in FIG. 4. It is apparent, however, that the response to ammonia is more complex than that to water. The ammonia is initially weakly bound to the surface by a fast reaction. A slower, secondary reaction follows in which the ammonia is more tightly bound to the surface and has a stronger effect on conductivity. The ammonia is then very slowly desorbed from the surface.

Hydrogen chloride has the opposite effect on conductivity, as shown in FIG. 5. The hydrogen chloride is a Lewis acid and reduces the number of carriers in the channel. The rate of desorption observed was midway between the rates for water and ammonia.

At this juncture it might be noted that a silicon surface prepared by cleavage in high vacuum or by vapor etching is extremely reactive. On exposure to oxygen or moisture, it is covered with a thin oxide layer within a few seconds. This native oxide is initially 10 to 20 A thick and reaches a limiting thickness of approximately 50 A in a few hours. This oxide layer has a high density and acts as a barrier to further oxidation of the surface. Adsorption from the gas phase occurs primarily at the oxide surface rather than on the surface of the silicon itself. Upon exposure to atmospheric moisture, the terminal silicon atoms in the oxide are hydrated. The SiOH sites or silanol groups are the most reactive sites on this surface and are the preferential locations for adsorption by polar molecules.

The practical utilization of ADFET sensors in ambient air and emission monitoring systems depends on modification of the surface adsorption sites to produce chemical specificity.

One of the most direct methods of modifying the surface adsorption characteristics of the native oxide is to replace the silanol hydroxide with alkoxide groups. The replacement reaction, SiOH + ROH 190°C Si-OR 4H₂O, can be carried out easily by passing alcohol vapors over the surface at elevated temperatures. The resulting surface is hydrophobic and decreases the response to SO₂ while retaining a high sensitivity to NO₂. By using other alcohols, additional functional types can be obtained, i.e., the surface can be tailored to adsorb different types of pollutants.

The stability of the surface produced in this manner is limited by the reversibility of the above reaction. Prolonged exposure of the surface to moisture reconverts the surface to its original state. Improved stability can be obtained if the reaction product contains silicon-carbon bonding rather than silicon-oxygen-carbon linkages. The silicon-carbon bond has greater thermodynamic stability and is much less susceptible to hydrolysis. Carbon-silicon bonding at the surface is difficult to form directly. However, several classes of organo-silicon compounds are available commercially which contain carbon-silicon bonding and which will react readily with the surface silanol groups. In general, displacement reaction of the type

may be carried out where X = -Cl, -H, -OH, -OR, or -COOCH₃. This reaction effectively extends the silicon dioxide lattice by one silicon atom and would not contain silicon-oxygen-carbon links.

As noted, chemical specific films can be produced by tailoring the surface chemistry of an ADFET structure. For example, Cholorosilones react to form stable chemical compounds with a silicon surface.

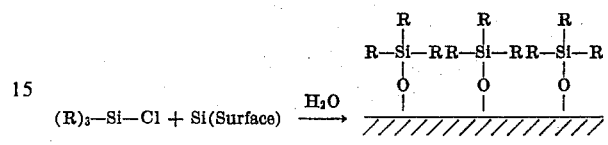

Silyl derivatives that interact with NO₂ and NO include those with substituted amino functional groups, ethylenic linkages, and phenyl groups. Silyl derivatives that interact with SO₂ include those containing hydroxyl substituents, amide and imidazole groups, as well as unsaturated hydrocarbon derivatives. Carbon monoxide is more strongly adsorbed by halogenated silanes than by hydrocarbon derivatives.

The reaction will be an interaction of filled electronic energy levels. The degree of electronic interaction is based on the extent of this adsorption.

Because of their use in gas chromatography, silyl compounds are commercially available. Specific compounds that can be used include dimethyl - and diethylaminomethylchlorosilane, diphenylmethylchlorosilane, dimethylvinylchlorosilane, tetramethyldisilane, trimethylsilylimidazole and chloromethyldimethyl.

The application of silyl compounds in gas chromatography is evidence of their thermal stability. However, the reactions of another type of organo-silicon compound with the semiconductor surface may offer even greater flexibility in design and enchanced stability. Alkyl triacetoxy silanes also react readily with the silicon surface; on exposure to water, air, or ultraviolet radiation they polymerize to form a stable, highly cross-linked monolayer.

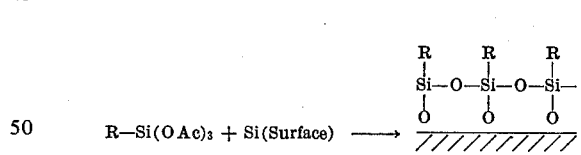

As with the chlorosilanes, selectivity can be provided with a variety of organic substituents. In addition, a metal alkoxide may be used to effect the condensation to form mixed oxide films.

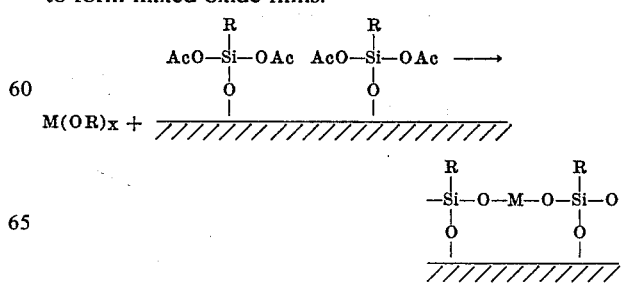

Metals which may be employed include boron, aluminum, arsenic, and phosphorus. The metals and organic groups can be chosen to produce Lewis acid or base sites of differing strengths.

Figure 1A:
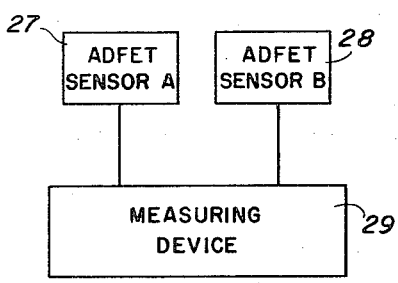
FIG. 1a is a diagrammatic view of an environment monitoring system utilizing a plurality of adsorption field effect transistors as shown in FIG. 1.

In this approach, total selectivity for a given pollutant is not expected from a single sensor. A set of sensors is utilized, each of which satisfies the basic requirements of sensitivity, stability, and long-term reliability, and each of which differs from other members in its response to at least one pollutant. Each member of the set is then characterized to the degree necessary for unambiguous computer reduction of the response matrix. That is, the response to known constituents of the environment is measured as required in order to enable computer reduction. To this end, the environment monitoring system shown in FIG. 1a includes a plurality of ADFET sensors 27, 28 such as illustrated in FIG. 1. ADFET sensor 27 may be provided with a chemically specific film 26 enabling preferential adsorption of a selected substance A, while ADFET sensor 27 may be provided with a chemically specific film 26 which may be the same as the chemically specific film of the sensor 27 or may be different therefrom enabling preferential adsorption of a selected substance B. The respective outputs of the sensors 27, 28 representing the responses thereof to known constituents of the environment to which the sensors 27, 28 are exposed are connected to a measuring device 29. The measuring device 29 receives the outputs of the sensors 27, 28 and correlates these outputs to produce respective measurements of the concentration of the substances A and B being monitored. For example, the outputs of the sensors 27, 28 may respectively correspond to the results shown in the graphs of FIGS. 4 and 5 which may be correlated by the measuring device 29 to obtain concentration percentages of ammonia and hydrogen chloride in the environment sample to which the sensors 27, 28 are exposed.

As discussed earlier, the ADFET is essentially a charge-sensing device. For this device to be useful as a practical solid state sensor, its surface structure must be changed to produce some degree of selectivity between polar gases. One technique is to incorporate certain chemically selective functional groups into the gate region of the ADFET, either through direct chemical reaction or by chemical deposition. The choice of surface treatment is a difficult problem however, since changes in the surface properties can have a desensitizing effect on the device. For example, as little as 200 A of thermally grown $SiO_2$ in the gate region of the ADFET structure has been found to completely desensitize the device.

A number of surface treatments have been developed in accordance with the invention which provide the necessary selectivity. As discussed previously one such surface treatment utilize a silicon-containing polymer species which can be applied to the surface by spinning and can be patterned using standard photoresist techniques. The material is quite versatile, in that a wide variety of functional groups can be incorporated into the polymer. By way of example, alkyl-triacatoxy silanes react readily with the surface and on exposure to water, air, heat, or ultraviolet radiation they polymerize to form a stable highly-cross-linked monolayer. In addition, unlike thermally grown $SiO_2$, the material does not appear to desensitize the surface of the device. The response characteristics of an ADFET structure onto which a 600 A layer of this spin-on polymer film had been deposited is summarized in Table I. Since 1% gas mixtures were used, the response characteristics were measured at 150° C to decrease the time required for the adsorption-desorption process to occur and to limit the amount of gas adsorbed on the surface. Note that a large increase in the sensitivity of the ADFET structure is obtained by the use of this polymer film. Measurements have been carried out at room temperature to determine the sensitivity of this structure to much lower gas concentrations. Concentrations on the order of 1/100 PPM or better can be detected by such a structure. When the proper chemically selective functional groups are incorporated into this film, a highly sensitive and selective coating results.

The results of forming chemically selective sites directly on the native $SiO_2$ surface of the ADFET structure are also summarized in Table 1. The reaction involved the formation of $SiOC_2H_5$ linkages through the 200° C reation of ethanol with the native oxide surface. As can be seen from Table 1, the reaction with alcohol produced a marked increase in the response to $NO_2$ relative to $SO_2$.

It may be seen with reference to Table 1 that the surface of the ADFET gate can be modified to obtain chemical specificity. For the analysis of binary mixtures of $NO_2$ and $SO_2$, the ADFET with spin-on polymer could be used to obtain the total concentration. This response with the response from the alcohol treated sensor would be sufficient to determine the ratio of the two gas concentrations.

Table 1

Percent Change in the Channel Conductance of ADFET Structures Due to Various Surface Treatments
(All measurements carried out at 150°C)

| | No Treatment | Spin-On Polymer Film | Alcohol Treatment |
|---|---|---|---|
| 1% $SO_2$ | 32% | 594% | 20% |
| 1% $NO_2$ | 50% | 521% | 90% |
| Ratio | 1.6 | 0.9 | 4.5 |

While the present invention has been described in detail with respect to illustrative embodiments, it is apparent that various changes and modifications may be made without departing from the scope or spirit of the invention. For example, ADFET sensors described could be used in a variety of applications where it is necessary to characterize the atmosphere or to characterize a source emitting into that atmosphere. These applications include not only the ambient atmosphere but also various industrial atmospheres where characterization of the atmosphere is necessary to insure the safety and/or health of workers. The concept is not limited to use in the characterization of gases but could be used with suitable modification for the characterization of liquids. Appropriate chemically selective films would be required and conductive liquids would require electrical isolation of the source and drain electrodes from the medium.

Additional areas of application include the characterization of water, both gaseous and liquid chemicals in processing or manufacturing, body fluids (urine, blood, etc.) or breath. For medical applications, the sensors could be used externally on samples or might be placed in situ for continuous monitoring.

What is claimed:

1. A system for determining the concentration of a plurality of selected substances in an environment comprising:
   a plurality of substantially identical semiconductor sensors, each of which includes means for effecting preferential adsorbing of specific ones of said selected substances to provide outputs correlatable to the respective concentration of each of said substances;
   each of said semiconductor sensors including a semiconductor substrate of one conductivity type having spaced apart regions of opposite conductivity type extending from one surface thereof, the semiconductor material between said regions defining a channel having an initial pretermined conductance with a selected bias, said preferential adsorbing means comprising a chemically specific film disposed over said channel for enabling preferential adsorption of a respective one of said selected substances, and the conductance of said channel being variable from said initial predetermined value in response to the amount and type of substance adsorbed by said chemically specific film; and
   each of said semiconductor sensors serving as respective field effect transistors whose outputs are indicative of the concentration of specific ones of said selected substances.

2. A system as set forth in claim 1, wherein said film of each sensor essentially comprises silicon oxide having an exposed adsorbent surface substantially free of silicon-oxygen-carbon linkages.

3. A system as set forth in claim 2 wherein the thickness of each of said films is on the order of 50A or less.

4. A system as set forth in claim 2 wherein at least one of said films of essentially silicon oxide is modified by replacement of silanol hydroxide molecules in the surface region thereof with alkoxide groups to produce a hydrophobic exposed surface having a high sensitivity to a respective one of said selected substances.

5. A system as set forth in claim 2 wherein the exposed surface region of at least one of said films of essentially silicon oxide comprises a reaction product containing silicon-carbon bonding and substantially free of silicon-oxygen-carbon linkages.

6. A system as as set forth in claim 1, wherein said film of each sensor comprises a polymerized organo-silicon compound containing at least one preselected chemically selective functional group.

7. A system as set forth in claim 1, wherein said film of at least one sensor comprises silicon oxide having an exposed surface region of modified constituency, said exposed surface region of said film being formed of the reaction product of silicon oxide and a metal alkoxide.

8. A system as set forth in claim 7 wherein said metal alkoxide includes a metal selected from the group consisting of boron, aluminum, arsenic, and phosphorus.

9. A sensor for determining the concentration of a preselected substance in an environment in the vicinity of said sensor comprising: a semiconductor substrate of one conductivity type; first and second spaced apart regions of opposite conductivity type in said semiconductor substrate and extending to the surface of said substrate, the semiconductor material between said regions defining a channel having an initial predetermined conductance; and means covering said channel for preferentially adsorbing said preselected substance, the conductance of said channel being variable from said initial predetermined value in response to the amount and type of substance adsorbed by said means; and said sensor serving as a field effect transistor whose output is indicative of the concentration of said substance.

10. An adsorption field effect transistor sensor for detecting the concentration of a preselected substance in an environment comprising:
   a. a semiconductor substrate of one conductivity type;
   b. at least two spaced apart regions of opposite conductivity type extending from one surface of said substrate defining a channel therebetween having an initial predetermined conductance; and
   c. a chemically specific film overlying said channel, said film being formed of a material enabling preferential adsorption from said environment of a preselected substance;
   d. the conductance of said channel being variable from said initial predetermined value in response to the amount and type of substance adsorbed by said chemically specific film, whereby the output of said adsorption field effect transistor sensor is indicative of the concentration of said substance in said environment.

11. An adsorption field effect transistor sensor as set forth in claim 10, wherein said chemically specific film essentially comprises silicon oxide having an exposed adsorbent surface substantially free of silicon-oxygen-carbon linkages.

12. An adsorption field effect transistor sensor as set forth in claim 11, wherein said film of essentially silicon oxide is modified by replacement of silanol hydroxide molecules in the surface region thereof with alkoxide groups to produce a hydrophobic exposed surface having a high sensitivity to said preselected substance.

13. An adsorption field effect transistor sensor as set forth in claim 11, wherein the exposed surface region of said film of essentially silicon oxide comprises a reaction product containing silicon-carbon bonding and substantially free of silicon-oxygen-carbon linkages.

14. An adsorption field effect transistor sensor as set forth in claim 10, wherein said chemically specific film comprises a polymerized organo-silicon compound containing at least one preselected chemically selective functional group.

15. An adsorption field effect transistor sensor as set forth in claim 14, wherein the material of said substrate is silicon, and said film comprises the reaction product of the silicon substrate surface and said organo-silicon compound.

16. An adsorption field effect transistor sensor as set forth in claim 15, wherein said organo-silicon compound is an alkyl-triacetoxy silane.

17. An adsorption field effect transistor sensor as set forth in claim 10, wherein said chemically specific film comprises silicon oxide having an exposed surface region of modified constituency, said exposed surface region of said film being formed of the reaction product of silicon oxide and a metal alkoxide.

* * * * *